June 12, 1962  W. J. WILDERN  3,038,695
FLARED TUBE GAS COCK
Filed March 30, 1959
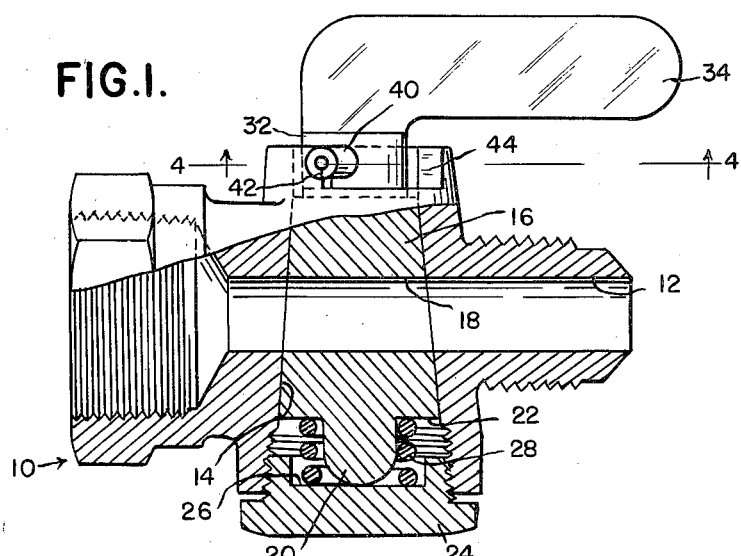
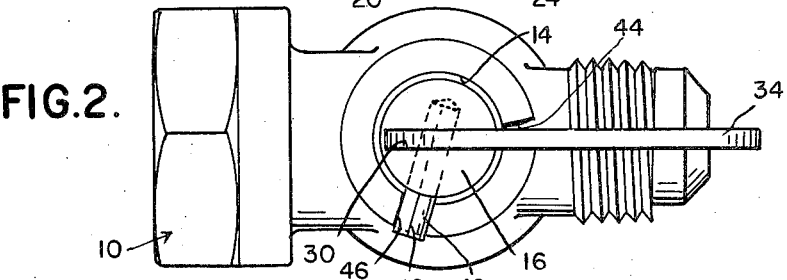
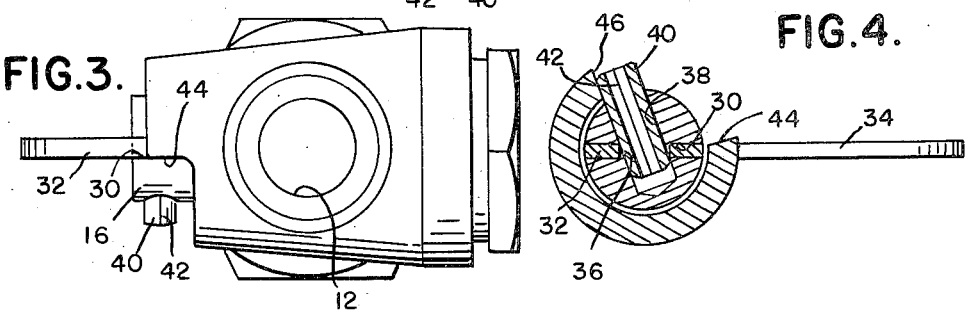
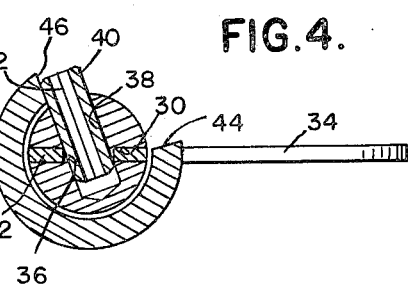
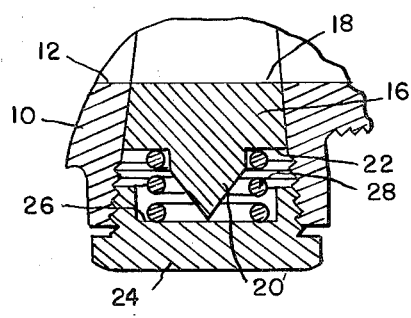
INVENTOR.
WILLIAM J. WILDERN
BY
Whittemore, Hulbert & Belknap
ATTORNEYS 3,038,695
FLARED TUBE GAS COCK
William J. Wildern, Detroit, Wayne County, Mich., assignor to The Roberts Brass Manufacturing Co., Mitchell, Ind., a corporation of Michigan
Filed Mar. 30, 1959, Ser. No. 802,698
3 Claims. (Cl. 251—181)

This invention relates to valve structures in general and refers more particularly to valve structures of the type having a non-displaceable rotor valve.

Valve structures with non-displaceable rotor valve or shutoff cock members are preferred for use in instances where the displacement of the rotor valve might cause the escape of combustible gases and result in fire or an explosion. Although different forms of such valves have been proposed, there is room for improvement both as regards to ease of manufacture and assembly, as well as in efficiency of operation and serviceable life.

It is an object of this invention to provide a valve structure having a novel form of non-displaceable rotor.

It is an object of this invention to provide a valve having a tapered rotor valve or shutoff cock member within a receptive tapered passage and so arranged as to be non-displaceable under normal operating conditions.

It is also an object of this invention to provide a non-displaceable valve structure having a minimum of frictional resistance to valve operation due to the particular form and arrangement of certain parts thereof.

Another object of this invention is to provide means of compensating for wear within the valve structure; both manual and self-compensating.

Still another object of this invention is to provide a valve structure of the type mentioned and having a serviceable handle connection made thereto, and one capable of performing another function as well.

A further object of this invention is to provide a particular means of engaging an operating handle to the valve rotor or plug, and useable in cooperation with stop shoulders formed from the valve body, for limit positioning of the rotor member.

Other objects and advantages in the practice of this invention will be more obvious upon a reading of the following specification, in conjunction with the accompanying drawing wherein:

FIGURE 1 is a side plan view of a valve structure embodying the teachings of this invention and having parts broken away and shown in cross section for better illustration of the inventive features thereof.

FIGURE 2 is a top plan view of the valve structure shown by FIGURE 1.

FIGURE 3 is an end view of the valve structure of FIGURES 1 and 2.

FIGURE 4 is a cross sectional view of part of the valve structure, as seen in the plane of line 4—4 of FIGURE 1 and looking in the direction of the arrows thereon.

FIGURE 5 is a fragmentary and cross sectional view of a modification of the valve structure shown by FIGURE 1.

Referring to the drawing, the valve structure includes a valve body 10 having a through-flow passage 12 formed therein. A valve cock receptive passage 14 is formed through the valve body 10 transversely of the flow passage 12. The passage 14 is frusto-conical and tapered or flared outwardly towards the lower end thereof.

A rotatable valve cock or plug member 16 is received within the tapered passage 14. The valve plug 16 is tapered to complement the form of passage 14. It is received into the valve body 10 through the large end of the tapered passage.

The valve member 16 is preferably formed from round brass stock and to include a flow passage 18 transversely therethrough. The passage 18 is disposed so that it may be aligned with the flow passage 12 when the valve member is properly oriented within the valve body. The lower end of the valve plug 16 is formed to include a central axial projection 20 which is rounded or spherical on the lower end, as in FIGURE 1. An annular shoulder 22 is provided about the projection 20 for purposes which will be described.

A closure or retaining cap 24 is received over the large end of the tapered passage 14 and is formed for engagement with the valve member 16. The closure member is received in threaded engagement with the valve body 10 within the passage 14.

A depression 26 is formed in the closure member 24 within the end thereof exposed to the passage 14. The valve member 16 has the projection 20 on the larger end thereof, received within the depression 26 and in substantially point contact therewith. It will be appreciated that such engagement lies on the axis of rotation of the valve rotor 16 and thereby assures a minimal frictional resistance to operation of the valve rotor.

The closure member 24, on being assembled with the valve body 10, may be used to position the valve plug 16 axially within the passage 14 for best operation. The closure member may also serve to compensate for wear between the valve body and plug parts, if later required.

A compression spring 28 is provided between the valve member 16 and the closure cap 24 for further wear compensation between the valve parts. The spring member 28 is received within the cap depression 26, about the end projection 20 of the valve member, and against the annular shoulder 22 on the end of the valve member 16. Accordingly, it is suited for automatic take-up and wear compensation.

The upper end of the valve member 16 is formed to include a milled slot 30 receptive of the shank 32 of a handle member 34. The handle member 34 is formed as a flat stamping. The handle shank 32 and the top of the valve plug 16 are formed to include radial pin receptive holes 36 and 38, respectively. A pin 40 is received through the hole 38 in the valve plug and the hole 36 in the handle shank to hold the handle engaged to the valve plug. The pin 40 is rolled to its cylindrical form and includes a split 42 lengthwise thereof. Accordingly, it may be press fitted into the hole 38, and yet may be removed if necessary.

The retainer pin 40 extends from the narrowed end of the valve plug 16 sufficiently to serve as a rotational stop against undue rotation of the valve plug. The walls of the valve body 10 are formed to include a relieved section about the upper end of passage 14, to receive the end of the pin, and shoulders 44 and 46 to engage and limit movement of the pin. Thus the valve plug 16 is rotatable in the valve body 10 only within certain limits. Naturally, these will usually be "on" and "off" positions with respect to the operativeness of the valve assembly.

*Assembly and Operation*

The valve structure disclosed is assembled as follows:
The tapered valve cock or plug 16 is received within the tapered passage 14 with its larger end disposed at the larger end of the passage. The compression spring 28 is disposed about the depending projection 20. The closure member or cap is threaded into engagement with the valve body 10 to close the passage 14. The spring 28 is received in the depression 26 formed in the closure member and the end of the projection 20 is engaged therewith.

The closure member 24 is intended to seal the larger end of passage 14 and to axially position the valve plug 16 for relatively easy rotation. The spring member 28 is intended to compensate for any wear later occasioned by repeated and long use of the valve.

The shank 32 of the handle 34 is received in the slot 30 formed in the narrowed top of the valve plug 16. The pin 40 is received through the valve end and handle shank to hold the control part engaged to the valve member. As mentioned, the pin is split so that it can be removed if necessary.

The assembly described will be seen to be a non-displaceable arrangement as regards the valve rotor 16. Its tapered shape prevents movement in one direction and the closure member 24 prevents movement in the other direction. The spring 28 adequately serves to compensate for wear between the valve body and valve cock and to maintain a leakproof structure.

The valve plug 16 is easy to operate. The handle 34 affords rotational leverage, the passage 14 serves as a bearing and guide, and the point engagement of the valve end or projection 20 with the closure member 24 affords no appreciable frictional resistance to valve actuation. While the area of bearing engagement between projection 20 and closure member 24 is made small to minimize resistance to rotation, the tendency to wear is increased by the concentration of pressure. However, the spring 28, which compensates for wear, also retards wear by partially relieving the pressure of bearing engagement between projection 20 and closure 24.

When the handle 34 is aligned with the flow passage 12 through the valve body 10, the flow passages 12 and 18 are substantially aligned. In this position of the valve plug 16 the pin 40 is engaged with the stop shoulder 46. To close the valve, the handle 34 is rotated until it is transverse of passage 12. In this position the pin 40 engages the other shoulder stop 44.

FIGURE 5 illustrates a modification which differs only in that the projection 20' on the large end of the valve plug 16 is pointed to have point contact with the retainer on the axis of rotation of the plug, thereby minimizing frictional resistance to turning. Otherwise the structure of FIGURE 5 is like that of FIGURES 1–4 and accordingly similar parts bear the same reference characters.

What I claim as my invention is:

1. Valve structure comprising a casing having a fluid passage therein, a frusto-conical bore in said casing extending across said passage and open at both ends, a rotary valve element for controlling the flow through said passage, said valve element including a ported frusto-conical plug having the same taper as said bore, said plug extending within said bore and across said passage and being rotatably seated in said bore in full surface-to-surface engagement therewith, a handle projecting from the small end of said plug beyond the small end of said bore for manual rotation of said plug, and a bearing and wear compensating assembly for holding said plug firmly seated in said bore in full surface-to-surface engagement therewith including a cover removably secured to said casing over the large end of said bore and having a transverse bearing surface facing said plug, a central axial projection on the large end of said plug in bearing engagement with said bearing surface of said cover to maintain the aforesaid surface-to-surface engagement between said plug and said bore, said projection being rigidly connected to said plug, said axial projection on said plug and said transverse surface of said cover being shaped to have a minimum area contact on the axis of rotation of said plug to reduce friction and promote easy rotation of said plug, the large end of said plug having a transverse surface surrounding said central axial projection and beyond which said axial projection extends, and a coil spring encircling and transversely located by said axial projection, said coil spring being compressed between said transverse surfaces on said plug and said cover and urging said plug toward the small end of said bore to partially relieve the pressure of bearing engagement between said projection and said bearing surface to retard wear and to automatically compensate for wear.

2. The valve structure defined in claim 1, wherein said axial projection is integral with said plug and has a spherically shaped end engaging said transverse surface of said cover to provide the minimum area contact aforesaid, and wherein said transverse surface of said cover is substantially flat.

3. The valve structure defined in claim 1, wherein said axial projection is integral with said plug and has a conical pointed end engaging said transverse surface of said cover to provide the minimum area contact aforesaid, and wherein said transverse surface of said cover is substantially flat.

References Cited in the file of this patent

UNITED STATES PATENTS

| 1,023,104 | Carpenter | Apr. 9, 1912 |
| 1,072,812 | Bertram | Sept. 9, 1913 |
| 2,253,643 | Mueller | Aug. 26, 1941 |
| 2,253,831 | Wantz | Aug. 26, 1941 |
| 2,383,054 | Frank | Aug. 21, 1945 |
| 2,571,925 | Mueller | Oct. 16, 1951 |
| 2,634,946 | Mueller | Apr. 14, 1953 |
| 2,815,766 | Mueller | Dec. 10, 1957 |

FOREIGN PATENTS

| 121 | Great Britain | Jan. 11, 1876 |
| 14,988 | Great Britain | July 21, 1905 |
| 340,358 | France | May 10, 1904 |
| 462,241 | Great Britain | Mar. 1, 1937 |
| 515,711 | Italy | Feb. 16, 1955 |